(12) United States Patent
Crittenden

(10) Patent No.: US 10,012,408 B1
(45) Date of Patent: Jul. 3, 2018

(54) EXTERIOR VENTILATOR DOOR FOR RECEIVING OUTDOOR AIR

(71) Applicant: Jerry G. Crittenden, Phoenix, AZ (US)

(72) Inventor: Jerry G. Crittenden, Phoenix, AZ (US)

( * ) Notice: Subject to any disclaimer, the term of this patent is extended or adjusted under 35 U.S.C. 154(b) by 0 days.

(21) Appl. No.: 15/732,734

(22) Filed: Dec. 21, 2017

(51) Int. Cl.
| | |
|---|---|
| F24H 3/02 | (2006.01) |
| F24F 12/00 | (2006.01) |
| E06B 7/04 | (2006.01) |
| E06B 7/08 | (2006.01) |
| E06B 3/70 | (2006.01) |
| E06B 7/28 | (2006.01) |
| E06B 7/02 | (2006.01) |

(52) U.S. Cl.
CPC .......... *F24F 12/001* (2013.01); *E06B 3/7015* (2013.01); *E06B 7/04* (2013.01); *E06B 7/08* (2013.01); *E06B 7/28* (2013.01); *E06B 2007/023* (2013.01)

(58) Field of Classification Search
CPC ... E06B 5/125; E06B 5/12; E06B 7/02; E06B 5/14; E06B 3/7015; E06B 7/04; E06B 7/08; E06B 7/28; E06B 2007/023; E06B 7/03; E06B 7/06; E06B 7/082; E06B 7/086; E06B 7/088; E06B 7/09; E06B 7/092; E06B 7/094; E06B 7/096; E06B 7/098; E06B 7/10; E06B 2007/026; E06B 3/7001; E06B 3/7003; E06B 3/72; E06B 2003/7011; F24F 13/18; F24F 12/001; Y02B 30/00; Y02B 80/00; F24D 3/14

USPC ....... 52/455, 456, 473; 454/195; 165/47, 53, 165/54, 55, 56, 57
See application file for complete search history.

(56) References Cited

U.S. PATENT DOCUMENTS

| | | | | |
|---|---|---|---|---|
| 1,107,369 | A * | 8/1914 | Shelton | E06B 3/5892 454/195 |
| 5,475,562 | A * | 12/1995 | Gow | H05K 7/20172 165/122 |
| 5,834,713 | A * | 11/1998 | Huang | B66B 7/00 187/391 |
| 6,386,969 | B1 * | 5/2002 | O'Brien | E06B 7/02 454/195 |
| 7,160,185 | B1 * | 1/2007 | Gemmer | F24F 7/013 169/91 |
| 9,109,389 | B1 * | 8/2015 | Crittenden | E06B 3/72 |
| 2002/0081963 | A1 * | 6/2002 | Wasson | E06B 7/02 454/195 |

(Continued)

*Primary Examiner* — Justin Jonaitis
(74) *Attorney, Agent, or Firm* — H. Gordon Shields

(57) ABSTRACT

A ventilator door brings fresh outside air into a structure through an outside grill and a blower pulls outside air into a duct in the door and the air flows through the duct and into the structure through an inside grill remote from the outside grill. Heat is transferred from the flow of air to a heat sink disposed against the duct to cool the fresh air flowing into the duct. A regenerative heat sink may be used to capture heat from a flow of air from inside the structure and transfer the captured heat to a flow of outside air flowing into the structure. With the regenerative heat sink, a second blower is used to blow the inside air through the duct and outwardly through the outside grill before the outside air is pulled into the duct and blown past the regenerative heat sink to warm the air flow in to the structure. Several embodiments are included.

17 Claims, 4 Drawing Sheets

(56) References Cited

U.S. PATENT DOCUMENTS

| | | | |
|---|---|---|---|
| 2004/0007347 A1* | 1/2004 | Stoller | H05K 7/206 165/47 |
| 2004/0253917 A1* | 12/2004 | Kim | E06B 7/10 454/200 |
| 2009/0101304 A1* | 4/2009 | Funada | F24F 12/006 165/47 |
| 2010/0197214 A1* | 8/2010 | Geremia, Sr. | E06B 7/03 454/195 |

* cited by examiner

EXTERIOR VENTILATOR DOOR FOR RECEIVING OUTDOOR AIR

BACKGROUND OF THE INVENTION

Field of the Invention

This invention pertains to an exterior ventilator door having elements for receiving fresh outdoor air and discharging the fresh outdoor air into the structure to which the door is secured.

Description of the Prior Art

Exterior doors are generally solid and do not allow air to pass through them. Bringing fresh outside air into a structure prior to the advent of the present exterior door was either opening a window or an exterior door. That is a most logical manner in which outdoor air is introduced into a structure, and is a very easy solution. The problem with such a solution is simply a matter of opening and closing a window or windows and then shutting them again. The simple solution also becomes acute when the structure, typically a home, is left without anyone being present. An open window is an invitation to burglars. Moreover, open windows and a vacant home in a rain storm invites water damage of from simple wetting to extensive damage.

An open door is even more impractical, for obvious reasons, including all of the above negative comments for open windows.

The present invention solves all of the problems discussed above for open windows and doors, regardless of window or door screens. Outside air is introduced into a structure, such as a home, without the problems associated with open windows and doors and a vacated structure.

The ventilator door of the present invention provides a practical solution to bringing fresh outdoor air into a structure, typically a home, by providing an air flow path through an exterior door.

The present invention may be applied to any type of exterior door, a flush door, a steel door, a fiberglass door, a stile and rail door, a composite materials door, or virtually any other exterior door. All of the doors include basic frames, well known and understood, according to their specific construction. See FIG. 5, discussed below.

The present invention includes at least a single conduit or duct extending vertically in a cavity in the door through which outside air is brought through the door. The air flow through the door is conditioned either by cooling or by heating, depending on the temperature difference between outside ambient air temperature and inside ambient air temperature.

SUMMARY

The invention described and claimed herein comprises a ventilator door having an air intake element on the "outside" of the door and at least a single duct within the door with an exit passage for a flow of fresh air on the "inside" of the door. Heat sinks either help to cool the incoming fresh air or to provide heat to warm the incoming fresh air, as required or desired.

Among the objects of the present invention include the following:

To provide and new and useful ventilator door;
To provide a new and useful exterior door permitting air to flow through the door;
To provide a new and useful exterior door with duct elements for the passage of fresh outside air into a structure to which the door is secured;
To provide a new and useful door having an air intake on the "outside" of the door and an air exhaust on the "inside" of the door;
To provide a new and useful exterior door providing air flow through the door in a duct extending vertically in the door and through which the air flows through the door;
To provide a new and useful door for providing a vertical flow of air through the door for providing fresh outside air into a structure;
For providing a new and useful ventilator door for providing a vertical flow of air through duct elements within the door for providing outside air into a structure;
To provide a new and useful exterior door;
To provide a new and useful exterior door for bringing fresh outside air into a structure;
To provide a new and useful exterior door through which air flows into a structure;
To provide a new and useful ventilator door having at least a single conduit through which air flows through the door;
To provide a new and useful door having a plurality of conduits through which air flows through the door;
To provide a new and useful door for conditioning air flow through the door;
To provide a new and useful door capable of cooling outside air as it flows through the door into a structure;
To provide a new and useful door capable of warming outside air as it flows through the door into a structure;
To provide a new and useful door having at least a single concealed duct in a cavity of a door through which air flows;
To provide a new and useful ventilator assembly for bringing fresh outside air into a structure; and
To provide a new and useful ventilator assembly adjacent to a door for bringing fresh outside air into a structure;

DESCRIPTION OF THE PREFERRED EMBODIMENT

Figure 1:
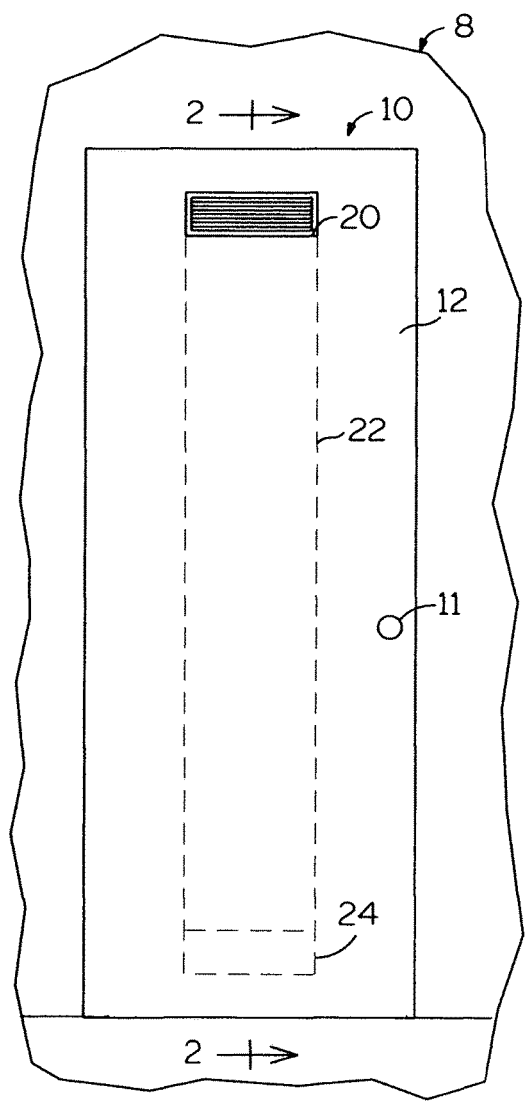
FIG. 1 is a schematic representation of a front view of a ventilator door of the present invention.

FIG. 1 is a schematic front view of a ventilator door 10 for a structure 8. The door 10 includes a knob 11 at one side of the door. For convenience, no other typical door hardware is shown or discussed. An air intake register or grill 20 is shown centered on the upper front of the door. Within the door is a vertically extending conduit or duct 22 shown in dotted line. The duct 22 terminates at the lower portion of the door 10 with air exhaust register or grill 24. The register or grill 24 is also shown in dotted line and is disposed on the inside of the door 10. Fresh outside air flows into the duct 22 and downwardly in the duct and is exhausted into the inside of the structure to which the door 10 is secured through the register or grill 24.

Figure 2:
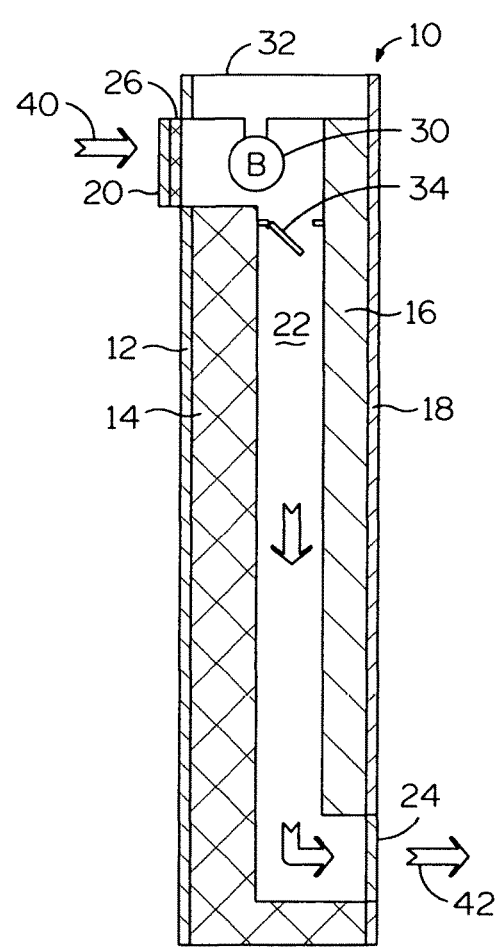
FIG. 2 is a side view in partial section taken generally along line 2-2 of FIG. 1.

FIG. 2 is a schematic view in partial section of the door 10 taken generally along line 2-2 of FIG. 1. For purposes of clarity, the scale is greatly exaggerated.

In practice, exterior doors are typically about one and three-fourths inches to two and a quarter inches thick. A door of the present invention may be about two and a quarter inches thick, with interior duct work in a cavity in the door occupying about five eighths of an inch. The width of a duct will vary according to the air transfer requirements. Contemporary blowers usable with the present invention generally provide from about seventeen cubic feet per minute air flow to about forty cubic feet per minute air flow. The depth of the duct is limited by the thickness if the door and the thickness of the layers, namely the outside layer, the insulation layer, and the heat sink, and the inside layer. The length of the duct is dependent upon the height of a door and the size of the blowers.

The ventilator door 10 includes at least three layers of materials, including a relatively thin exterior or outside layer 12. A relatively thick insulation layer 14 is layer number two. Layer number three is an inside layer 18. The duct 22 is disposed between the insulation layer 14 and the inside layer 18.

The terms "outside" or "exterior" and "inside" pertain to the relationship of the door to the structure to which the door is secured. That is, the "outside" of the door refers to the face of the door through which fresh air enters the door. The "inside" of the door refers to the face of the door from which fresh outside air enters the structure to which the door is secured. The term "ventilator" refers to a type of door through which fresh outside air passes through to provide fresh outside air to the inside of a structure. Thus, the door 10 of the present invention is an exterior "ventilator door."

An appropriate heat sink layer 16 is disposed against the duct or conduit 22 and against the inside layer 18. Depending on the expected temperature differential between the outside ambient air entering through the grill 20 and the inside ambient air temperature to which the fresh air flowing through the duct 22 is discharged, the heat sink 16 may be on one side of the duct 22 or on two or three sides, as required for appropriate conditioning of the air.

It will be noted that the inside or interior layer 18 may be as thick or thin as desired to effect the most synergistic compatibility with the heat sink 16.

On the inside of the door 10, at the lower portion of the duct 22 is the exhaust or discharge grill 24 through which the conditioned air flow is discharged or vented into the structure 8 to which the door is secured, such as a home.

Adjacent to the grill 20 is a filter 26. Fresh air flow 40 is pulled into the duct 22 through the grill 20 and through a filter 26 by a blower 30. The blower 30 is controlled by electronic elements in a power transfer housing 32 at the top of the door 10. Within the housing 32 are appropriate power transfer elements for transferring electric power for the blower 30 and associated control elements.

A damper 34 is disposed in the duct 22 below the blower 30. The fresh air flow 40 opens or moves the damper 34 when the blower 30 is turned on by electronic elements in the power transfer elements housing 32. The damper 34 in the closed position prevents an outside wind from forcing unwanted fresh outside air through the door 10. The damper 34 may be spring loaded to the closed position, or may be held closed in any appropriate or desired manner until the blower 30 is turned on.

The fresh air flow 40 is appropriately conditioned in the duct 22 to lower the temperature of the air flow or to raise the temperature of the air flow, as required. The temperature of air flow 42 discharged through the duct 24 thus matches as close as possible the ambient temperature of the air inside of the structure to which the door 10 is secured.

Figure 3:
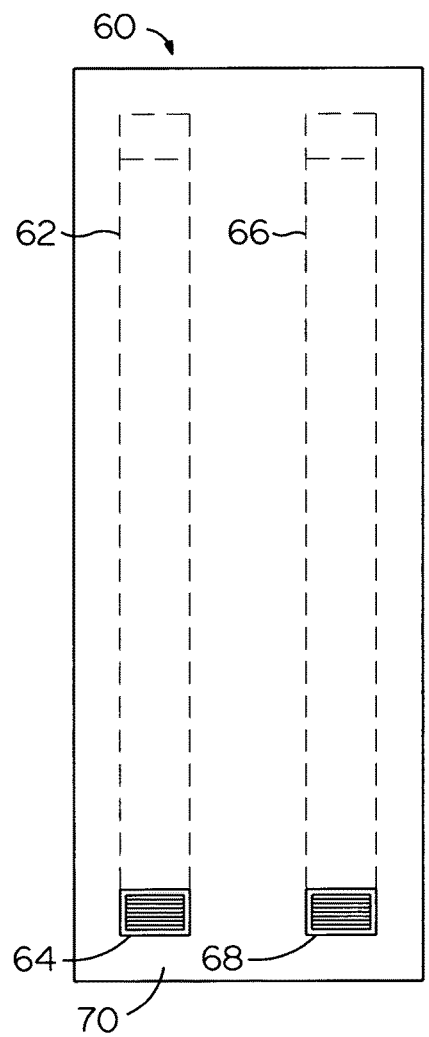
FIG. 3 is a schematic representation of a rear view of an alternate embodiment of the door of FIG. 1.

A single duct with a single blower is illustrated in FIGS. 1 and 2, but a pair of ducts, as shown in FIG. 3 may be employed, or any desired number of ducts, depending on the size of a door, the amount of air desired to be transferred, temperature differentials, available heat sink elements, etc.

FIG. 3 is a rear plan view of an alternate embodiment door 60 of the present invention. The door 60 includes two spaced apart conduits or ducts 62 and 66 rather than the single duct 22 of the door 10. The ducts 62 and 66 are shown in dotted line. In all other respects the door 60 is substantially identical to the door 10.

At the bottom of each duct is an exhaust or discharge grill 64 and 68 for the ducts 62 and 66, respectively.

The door 60, like the door 10, generally includes three layers, an outside layer, an insulation layer, and the inside layer or face 70. Heat sink elements are disposed against the ducts 62 and 66. The inside layer is disposed against the heat sink layers Only the inside layer 70 is shown in FIG. 4.

The door 60 may also include a second blower for each of the two ducts 62 and 66, as with a door 80, discussed below and shown in FIG. 4. The heat sinks for the ducts 62 and 66 may also be regenerative heat sinks like the heat sink 86 for the door 80, and may also include auxiliary heater strips such as the heater strip 87. Thus, a door with multiple ducts, such as the door 60, may simply be a duplicate of the single duct doors, such as 10 and 80.

The door 60 also includes the necessary or desired electronic elements, such as the desired sensors, for controlling the blowers and any other electrical and electronic components associated with the door.

Figure 4:
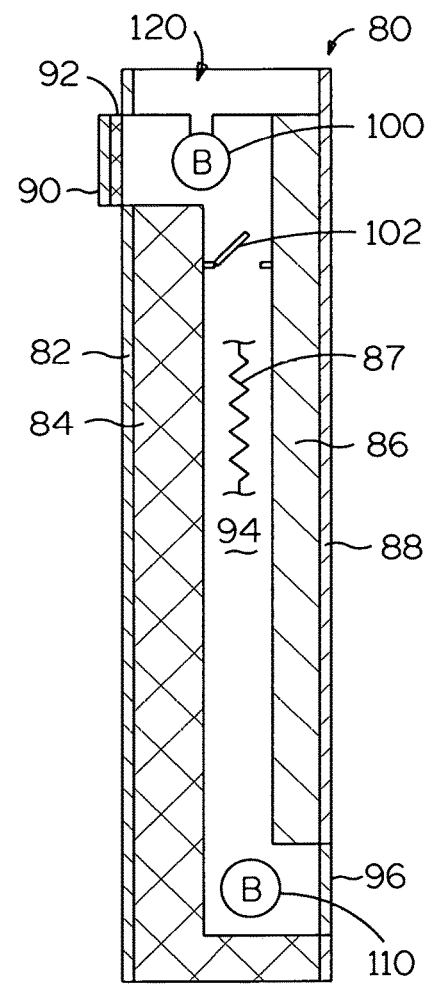
FIG. 4 is a side view in partial section of another alternate embodiment of the present invention.

FIG. 4 is a schematic view in partial section similar to FIG. 2, of an alternate embodiment 80 of the present invention. Like FIG. 2, the scale of FIG. 4 is greatly exaggerated for purposes of clarity.

The door 10 is generally used in a relatively warm climate, such as the American Southwest, where the outdoor air temperature is substantially greater than the indoor temperature. However, in a more temperate climate, where the outdoor temperature is generally lower than the indoor temperature, the embodiment of a door 80 has advantages.

The door 80 of FIG. 4 includes an exterior or outside layer 82 and an insulation layer 84 is disposed against the exterior layer. A regenerative heat sink layer 86 comprises a third layer. An interior or inside layer 88 is disposed on the heat sink layer 86. Again, the interior layer 88 may be as thin as desired.

An air duct 94 is disposed between the insulation layer 84 and the interior or inside layer 88. Again, the heat sink layer 86 may be disposed against the duct 94 on as many sides of the duct as necessary to accomplish the desired heat transfer. Thus, the duct 94 may be covered on one, two, or three sides, as desired.

An outer or outside grill 90 communicates with the duct 94 at an upper portion of the duct. A filter 92 is disposed between the grill 90 and the duct 94 for filtering the incoming or intake air through the grill 90.

An upper blower 100 pulls fresh outside air into the duct 94 through the grill 90 and the filter 92. A power transfer elements housing 120 contains the electronic elements for controlling the various devices associated with door 80, including the upper blower 100 and a lower blower 110, and is disposed at the top of the door 80. This will be discussed below.

A damper 102 is disposed in the duct 94 below the upper blower 100. The damper 102 is normally closed, and in the closed position prevents an undesirable outside wind from blowing air through the duct 94.

At the lower portion of the door 80 is an inside grill 96. The grill 96 communicates with a lower portion of the duct 94. Adjacent to the grill 96 is the lower blower 110. The blower 110 is also controlled by the elements in the housing 120. If desired, a lower filter may be disposed adjacent to the grill 96, as with the filter 92 and the grill 90.

The heat sink 86 may be a regenerative ceramic heat sink for capturing heat from a first air flow and transferring the captured heat to a second air flow.

When the outdoor air temperature is lower than the inside air temperature, the lower blower 110 is activated for a predetermined time, for example, one minute, to pull inside air through the grill 96. As the inside air flows upwardly in the conduit or duct 94 and transfers heat to the regenerative heat sink 86 and outwardly through the grill 90. After the predetermined time period, the lower blower 110 turns off, and the upper blower 100 turns on.

The upper blower 100 pulls fresh colder outside air through the grill 90 and the filter 92 and pushes the outside air down the duct 94 and passed the regenerative heat sink 86 and into the structure through the grill 96. The heat captured by the heat sink 86 is transferred to the colder incoming air and warms the air as it flows downwardly in the duct 94. The warmed outside air is then discharged into the structure through the grill 96.

In extreme climates, heat strip elements may be required to supplement the heat captured by the regenerative heat sink 86. A heat strip 87 is schematically shown in FIG. 4 adjacent to the heat sink 86.

The timing of the two blowers and the heater strip 87 may be as desired, according to the outside air temperature and the inside air temperature. For example, a cycle of one minute on for a blower and then off and one minute on for the other blower. The cycling times for the blowers may be the same or may be different, depending on the temperature differences.

The electronics package housing 120 includes the necessary elements, which may include a microprocessor, power transfer elements, temperature sensor elements, and appropriate electric cables connected to the two blowers, and any other desired elements.

An appropriate power source for the electronics housings 32 and 120 may be connected inductively, through a hinge, or in any other appropriate manner.

The door 80 may be referred to as a modified heat recovery ventilator door, or as using a modified heat recovery system (HRV). The heat contained in the warm inside air is recovered or captured in the regenerative heat sink 86 and is used to warm the incoming cold air.

The drawing figures illustrate a generally straight vertical path through the ventilator doors, but if a longer paths for the air flows are desired, serpentine ducts may be employed.

Contemporary electronics allow many functions to be controlled by smart phones, computers, microprocessors, and the like. Accordingly, the electronics in the housings 32 and 120 may control, or be controlled, in a variety of ways. Electronics may control not only the blowers 30, 100, and 110, and the heat strip 87, but also exhaust fans appropriately located throughout a structure when the blowers 30 and 100 are actuated, a servo or other appropriate actuator for the damper 102, cameras, indoors and outdoors or in a door, or other desired elements. The possibilities are limited only by a users desires and the technology of the times.

The opposite is also very possible, the electronics in the housings 32 and 120 may be remotely controlled by a computer, smart phone, or other remote device. A multitude of sensors may also be installed with the present apparatus, such as temperature sensors not only with the ducts and blowers, but also in other locations in the structure.

The door 60 may also include both upper and lower blowers, and the associated electrical and electronic elements associated therewith, as desired, such as shown for the door 80.

Figure 5:
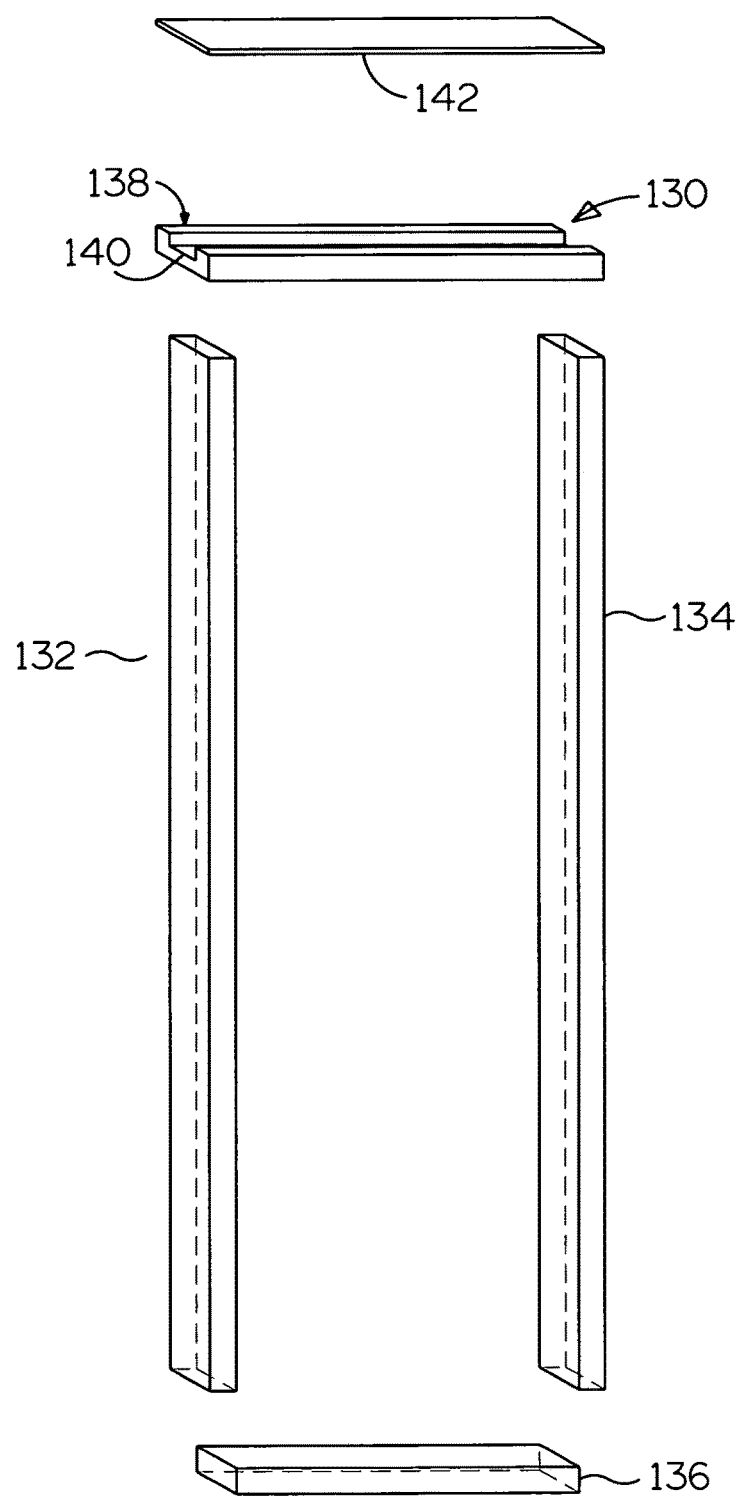
FIG. 5 is an exploded perspective view of a general frame for a door of the present invention.

FIG. 5 is an exploded perspective schematic representation of a frame 130 which includes the basic elements for any type of door, as referred to above, for providing a flow of fresh outside air into a structure.

The frame 130 includes a pair of stiles 132 and 134, and a pair of rails 136 and 138. The rail 136 is a bottom rail, and the rail 138 is a top rail. The top rail 138 includes a dado or recess 140 in which is disposed a housing for the electronic elements for the door, including power transfer elements, as discussed above.

The dado 140 may be as large or as small as required for the electronics associated with a door, such as the electronics housings 30 or 120, including power transfer elements and the electronic elements, microprocessor, etc., for controlling the blowers and any other required or desired elements, as discussed above.

A removable access panel or cover 142 is shown spaced apart from the top rail 138 and above the dado 140. The cover 142 protects the housing and elements disposed within the rabbet 140, and provides access as required for the components or elements.

Obviously, additional frame elements may be required for supporting the blowers, door handles, locks, and other elements required for doors.

While the doors of the present invention bring fresh outside air into a structure, the same volume of air will be evacuated from the structure. Ordinary exhaust fans, such as located in kitchen areas, laundry areas, bathroom areas, or other, may be used for the purpose of exhausting stale air from the structure. The exhaust fans may be controlled as discussed above.

Figure 6:
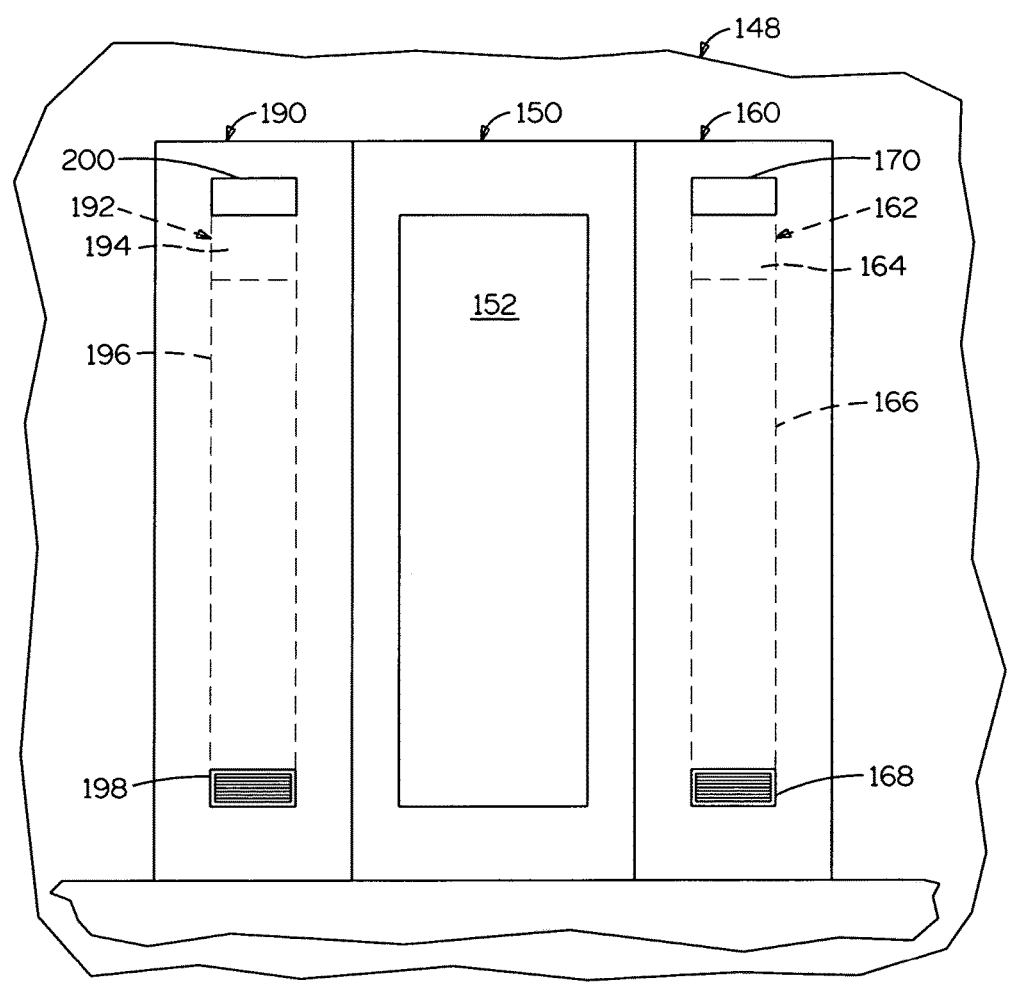
FIG. 6 is a front view of another embodiment of the present invention.

FIG. 6 is a front view of another alternate embodiment of the present invention, namely a door with a pair of side panels, one or both of which may include a ventilator assembly. This embodiment is particularly adapted to a door which includes some type of a glass panel. The door may be a typical stile and rail door, or any other type door, as desired. As illustrated, the door assembly includes a stile and rail door with a center panel and two side panels adjacent to the door. The side panels also include appropriate frame elements, such as shown in FIG. 5, except that the top rails need not include dados, because there is space above the duct elements for the electronic elements. This will be discussed below.

An outside door 150 for a structure 148 includes two side panels, a panel 160 and a panel 190. The door 150 includes a center panel 152, which may be as desired, such as a solid panel or a glass panel, or a combination of solid lower panel and a glass upper panel, or the like. Such door may include one or two side panels. Two side panels are shown in FIG. 6. The side panels typically may include matching panel elements, such that the door and side panels present a pleasing symmetry.

However, in FIG. 6, both side panels may include ventilator elements such as shown in FIGS. 2 and 4, with at least a single blower, as shown in FIG. 2.

It will be noted that the term "panel" and its plural, with respect to the side panels 160 and 190, as discussed below, actually comprise hollow elements, or a plurality of separate panels and associated duct elements as discussed and illustrated for the ventilator doors 10, 60, and 80, as illustrated in FIGS. 2, 3, and 4.

The side panel 160 includes a ventilator assembly 162. The ventilator assembly 162 includes an outside grill 164, with a filter and an upper blower with a damper element, as shown in FIG. 2. The assembly 162 also includes a conduit or duct 164 which extends downwardly from the blower and terminates in an inside grill 168.

The panel 190 is substantially identical to the panel 160, with a ventilator assembly 192, an outside grill 194, an air filter, upper blower and damper panel, conduit or duct 196, and an inside grill 198.

An electronic control system for the panel 160 may be included in a housing 170 above the ventilator assembly 162. A power transfer and electronic control system for the door panel 190 may be disposed in a electronics package housing 200. The power transfer is simplified because ordinary house current may be wired directly into the electronics package. The electronic control system, including sensors, may be as previously discussed above for the doors 10, 60, 80, and 90. In the alternative, the two ventilator assemblies 162 and 192 may be controlled by a single system, disposed either in the housing 170 or 200.

While the ventilator assemblies 162 and 192 have been broadly described as including the elements of the embodiment of FIG. 2, they may also include the elements of FIG. 4. Thus the side panels may include an upper blower and a lower blower, as desired, including regenerative heat sinks and auxiliary heat strips.

Door assemblies such as the door assembly 150 are rather popular for contemporary homes. With such door assemblies the door may have an upper glass panel or a full glass panel, and the side panels may also include upper glass panels, but the width of the side panels is sufficient to provide the desired fresh air flow in a shorter vertical distance. In the alternative, the side panels may be substantially full length such as shown for the doors 60 and 90, and as described.

The various elements of the door apparatus of the present invention are relatively well concealed, and thus do not interfere with the decor of a structure, and especially with a door. The only indication of a duct within the door or side panel is the presence of grills, inside and outside. And the grills may be easily configured so as to be decorative rather than obtrusive. Moreover, the location of a side panel may be remote from a door if desired. Contemporary door designs include single doors by themselves or with sidelights or panels, either singly of double, double doors with double or single sidelights or panels, and other designs according to the size of the entry areas.

While the principles of the invention have been made clear in illustrative embodiments, there will be immediately obvious to those skilled in the art many modifications of structure, arrangement, proportions, the elements, materials, and components and methods used in the practice of the invention, and otherwise, which are particularly adapted to specific environments and operative requirements, without departing from those principles. The appended claims are intended to cover and embrace any and all such modifications, within the limits only of the true spirit and scope of the invention.

What I claim is:

1. A ventilator door for bringing fresh outside air into a structure comprising in combination:
    an outside panel;
    an insulation panel disposed against the outside panel;
    an air duct disposed against the insulation panel;
    a heat sink disposed against the air duct;
    an inside panel disposed against the heat sink;
    an outside air grill connected to the air duct through which fresh air flows into the duct;
    an inside grill connected to the air duct remotely from the outside grill through which the fresh air flows into the structure; and
    a first blower adjacent to the outside grill for providing a first flow of fresh air through the outside grill and into the duct and outwardly through the inside grill into the structure.

2. The door of claim 1 which further includes power transfer elements for providing power to the first blower.

3. The door of claim 2 which further includes a filter adjacent to the outside grill for filtering the flow of air into the duct.

4. The door of claim 3 which further includes a second blower disposed adjacent to the inside grill for providing a second flow of air from inside the structure through the duct and outwardly through the outside grill.

5. The door of claim 4 in which the power transfer elements includes elements for providing power to the second blower.

6. The door of claim 5 in which the power transfer elements includes timer elements for timing the power transferred sequentially to the first blower and to the second blower.

7. The door of claim 6 which further includes a heat strip for providing auxiliary heat for the first flow of fresh air flowing through the duct.

8. The door of claim 1 where in the air duct is a first air duct and the door further includes a second air duct spaced apart from the first air duct and further includes a second outside grill and a second blower for providing a second flow of fresh air from the second outside grill into the second duct; and further provides a second inside grill connected to the second duct through which the second flow of fresh air is blown into the structure.

9. The door of claim 8 which further includes a first filter connected between the first outside grill and the first blower for filtering the first flow of fresh air into the first duct.

10. The door of claim 9 which further includes a second filter connected between the second outside grill and the second blower for filtering the second flow of fresh air into the second duct.

11. A ventilator door through which fresh air flows for providing fresh air into a structure comprising in combination:
    a door frame;
    an outside panel secured to the door frame;
    a layer of insulation disposed adjacent to the outside panel;
    an air duct disposed adjacent to the layer of insulation;
    a heat sink disposed against the air duct;
    an inside panel disposed against the heat sink and secured to the door frame, an outside grill secured to the outside panel through which fresh air passes;
    an inside grill connected to the air duct through which the fresh air flows into the structure;

a first blower adjacent to the outside grill and connected to the air duct for providing a flow of fresh air to the air duct and into the structure through the inside grill; and power transfer elements for providing power for the first blower.

12. The door of claim 11 which further includes a second blower connected to the inside grill for providing a first flow of inside air to the duct and outwardly through the outside grill.

13. The door of claim 12 which further includes a second outside grill and a second duct;

a second heat sink connected to the second duct;

a third blower connected between the second outside grill and the second duct for providing a second flow of fresh air to the second duct;

a second inside grill through which the second flow of fresh air flows into the structure; and a fourth blower connected to the second inside grill for providing a second flow of inside air through the second duct and outwardly through the second outside grill.

14. An exterior door secured to a structure and having a ventilator panel assembly adjacent to the door, the ventilator panel assembly comprising in combination:

a frame;

an outside layer secured to the frame;

an insulation layer secured to the outside layer;

a duct disposed against the insulation layer;

a heat sink secured to the duct;

an outside grill secured to the duct;

an inside layer secured to the heat sink;

an inside grill secured to the duct remotely from the outside grill; and a blower secured to the duct between the outside grill and the duct for providing a flow of fresh outside air through the outside grill and through the duct and through the inside grill and into the structure.

15. The ventilator assembly of claim 14 which further includes electronic elements for controlling the blower.

16. The ventilator assembly of claim 15 where in the blower is a first blower and the ventilator assembly further includes a second blower adjacent to the inside grill for providing a flow of inside air through the inside grill and through the duct and outwardly through the outside grill.

17. The ventilator assembly of claim 16 in which the electrical elements include elements for sequentially controlling the first and second blowers.

* * * * *